Nov. 1, 1960 G. O. PUERNER ET AL 2,958,838
COMBINATION SWITCH AND CONTROL ASSEMBLY
Filed June 10, 1959 5 Sheets-Sheet 1
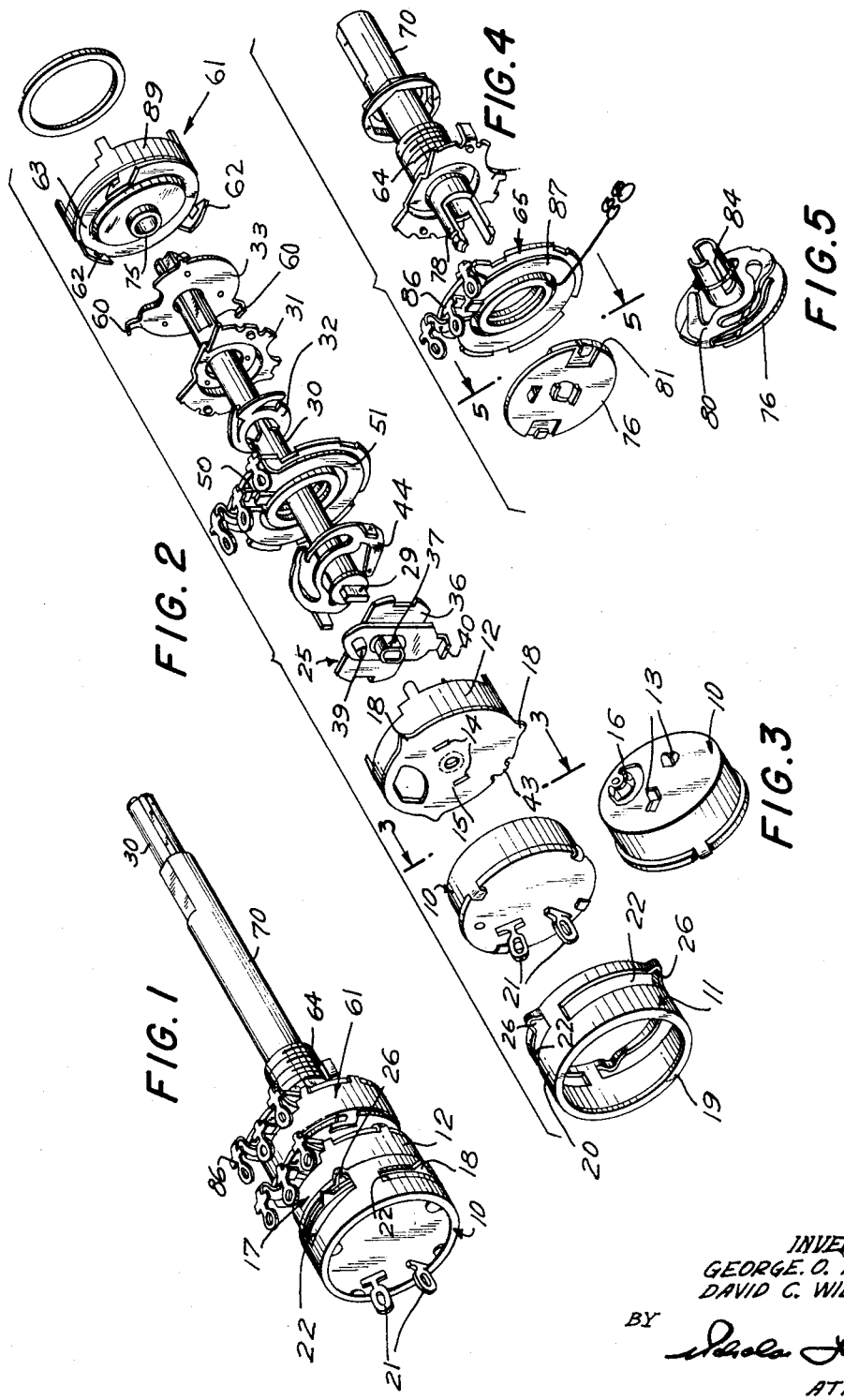
INVENTORS.
GEORGE. O. PUERNER
DAVID C. WILLIAMS
BY
ATTORNEY

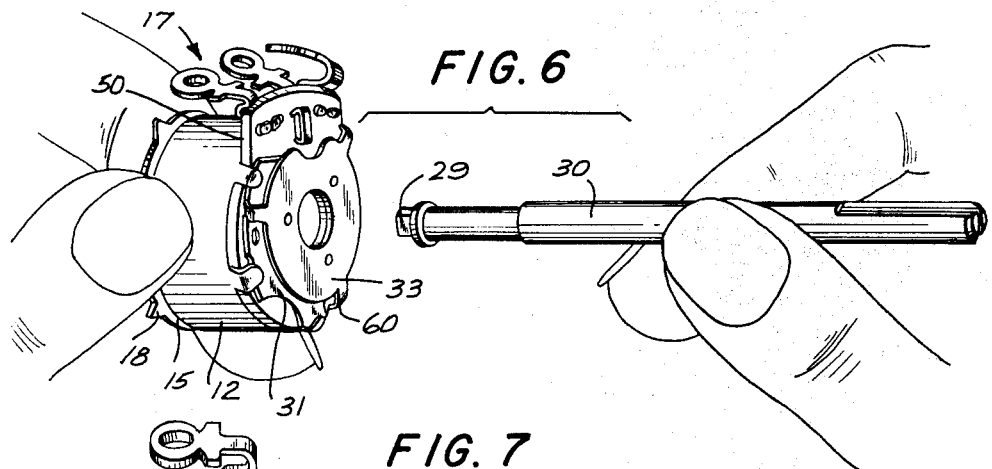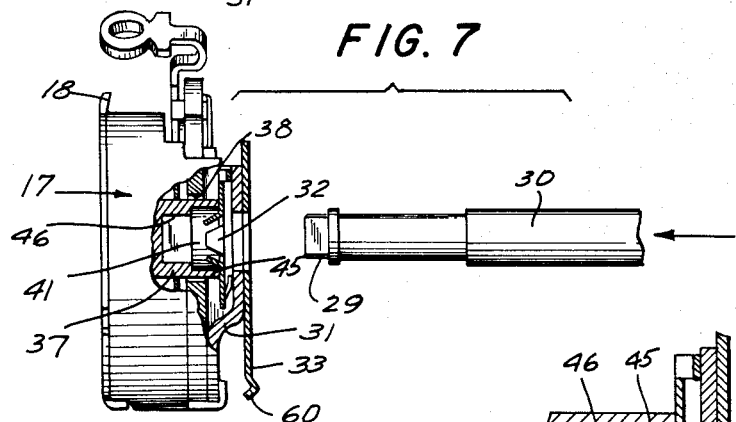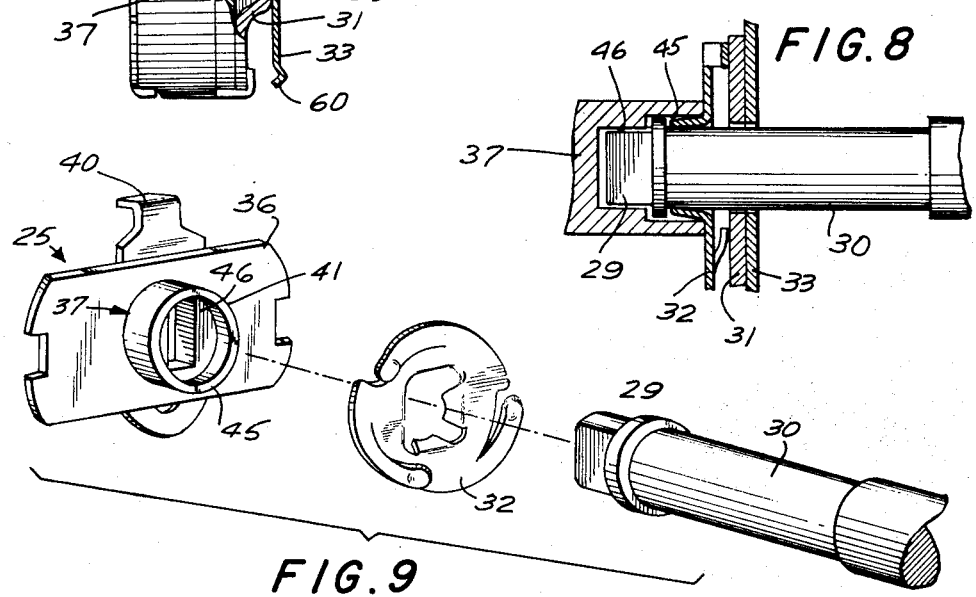

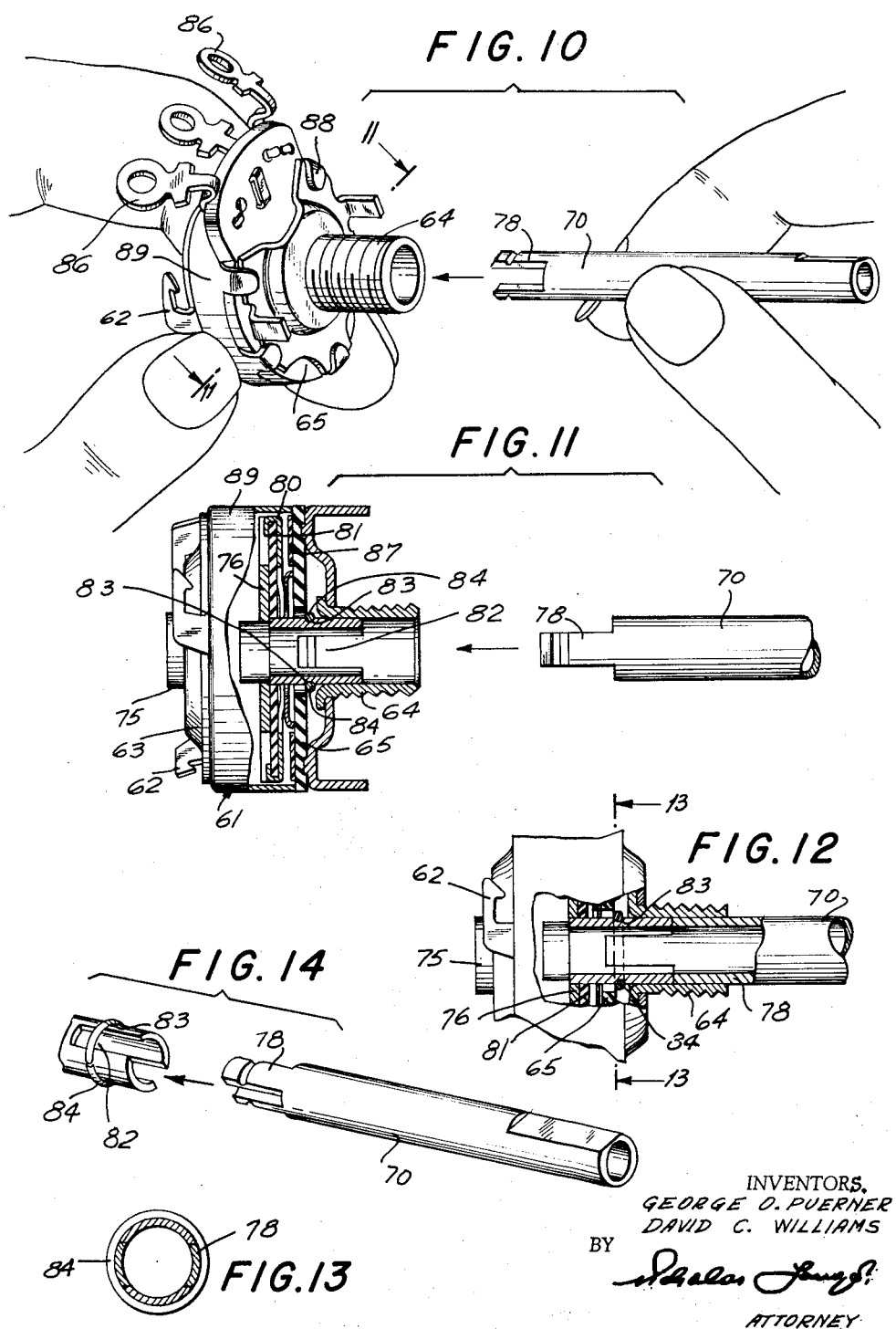

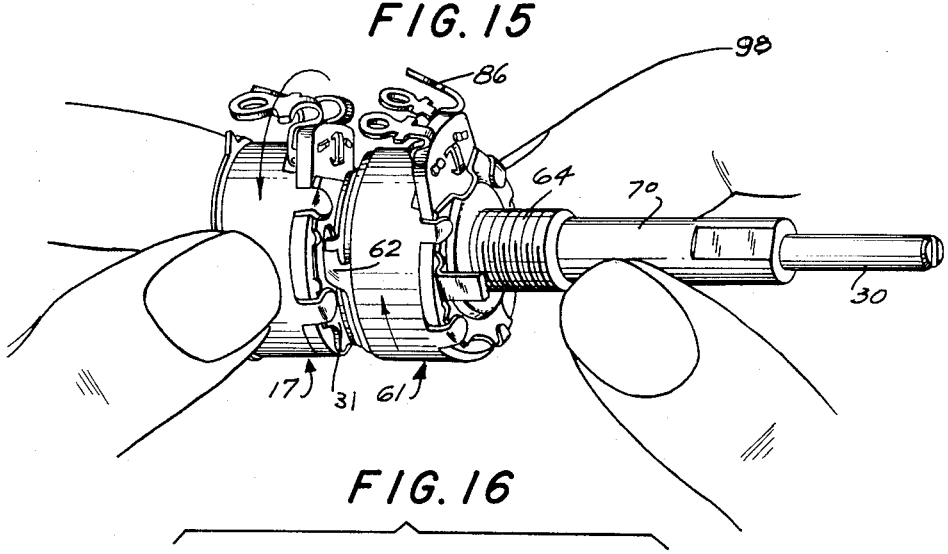
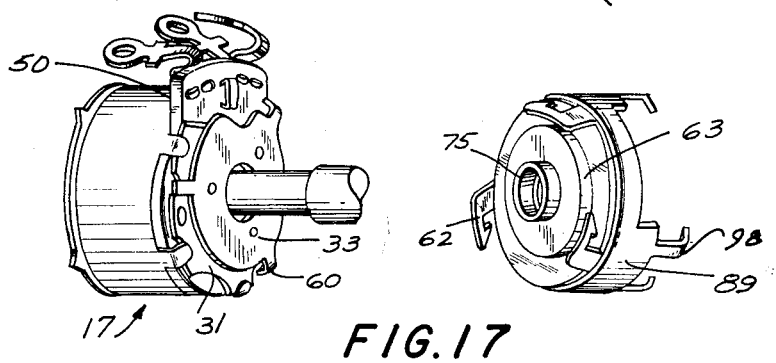
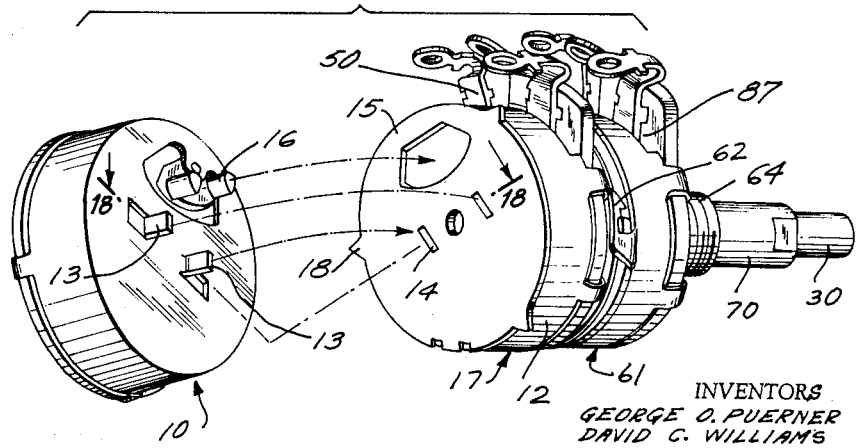

Nov. 1, 1960 G. O. PUERNER ET AL 2,958,838
COMBINATION SWITCH AND CONTROL ASSEMBLY
Filed June 10, 1959 5 Sheets-Sheet 5

INVENTORS
GEORGE O. PUERNER
DAVID C. WILLIAMS
BY
ATTORNEY

United States Patent Office 2,958,838
Patented Nov. 1, 1960

2,958,838

COMBINATION SWITCH AND CONTROL ASSEMBLY

George O. Puerner, Frankfort, and David G. Williams, Lebanon, Ind., assignors to P. R. Mallory & Co., Inc., Indianapolis, Ind., a corporation of Delaware Filed June 10, 1959, Ser. No. 819,326

5 Claims. (Cl. 338—172)

This invention relates to variable resistance devices such as volume controls which are used in radio receivers, transmitters and allied equipment and electrical and electronic instruments.

In order to provide and replace combination dual and switch controls used in the communication or control industries, such as computers, electrical and electronic instrumentation, radio and television receivers, a distributor or dealer would have to carry several hundred different combinations of custom built units having varying combinations of ohmic values. This almost becomes prohibitive in nature, taken from aspects of cost, inventory space and handling.

The present invention, therefore, provides a constructional adaptation of a severality of individual controls to form a determined combination suitable for a particular device. The individual parts heretofore obtainable only as a single combined unit assembled at the factory, may be purchased separately and combined by the operator at a point remote from the plant to form a unitarily operable multiple control and switch. The invention thus provides means for quickly and easily cooperatively assembling a severality of discretely valued resistance sections of a volume control-switch so that the outlay and cost for control and switches is considerably reduced and the convenience, as regards availability and replacement, greatly enhanced. Further, although some attempts had been made in this direction, it had been found that the alignment, and rotational characteristics together with the inefficiency of these other controls left much to be desired. These could not be assembled without considerable trouble, wobbled, came apart and generally were unreliable in operation. The present assembly, however, is quick, facile, and readily adaptable to all requirements. The improvements found herein have made the control combination one that is sturdy, compact and efficient and one which has enabled it to find ready acceptance in the industry.

An object of the invention is to improve variable resistance devices.

A further object is to provide a variable resistance device made up of individual parts which are adapted for assembling in a variety of ways.

A further object is to improve the parts for variable resistance devices.

Another effect of the invention is to provide a variable electrical control and attachable switch of the type employing coaxially aligned shafts which can be easily assembled and are relatively inexpensive to manufacture.

It is another object of the present invention to provide a dual control and switch assembly whose parts may be assembled in complete units.

Still another object of the present invention is to provide a tandem resistance-switch device comprised of a multiplicity of individual sections of any number of different values which can be easily assembled into a combination unit by the coupling of the separate individual sections without the use of tools, said combination being sturdy, tightly connected and permanently locked.

Still another object of the present invention is to provide a tandem resistance-switch control device which is adapted for custom assembled exact replacements for virtually all current models of radio and television equipment; said device obviating the need for tooling so as to permanently attach the individual sections thereof in any number of determined resistive value combinations.

Other objects of the invention will be apparent from the description and the claims.

Fig. 1 is a longitudinal view of an assembled variable control and switch device having dual control sections activated by a switch section;

Figs. 2–5 are exploded, raised views of the assembly so as to more adequately illustrate the cooperative arrangement of the parts; and Figs. 6–21 are illustrative of the separate sections of the composite control, with portions broken away to show the cooperative arrangements of parts and as taken along various line sections as indicated therein.

Figure 18:
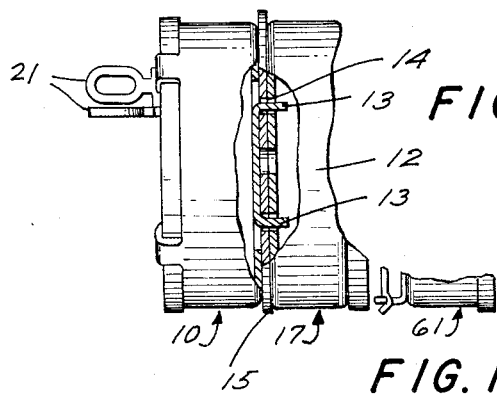
Figure 19:
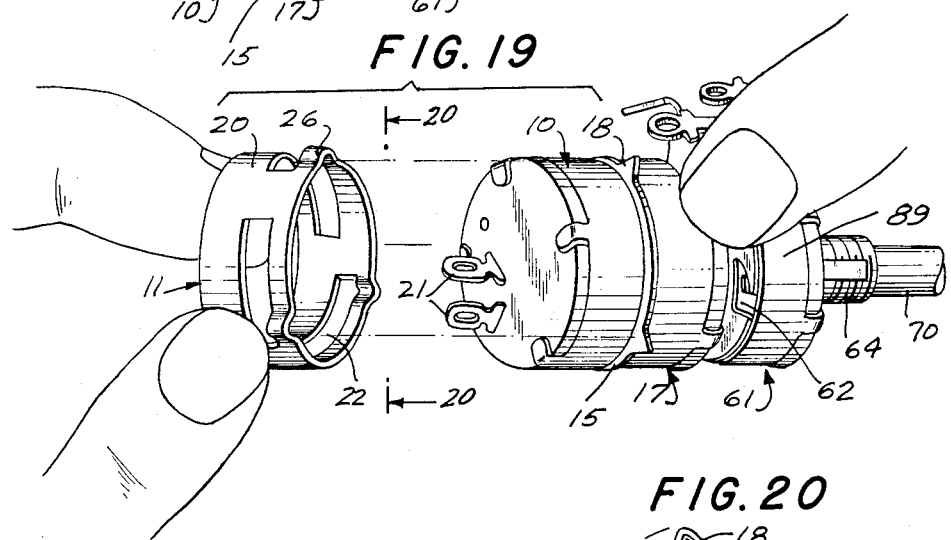

Generally speaking, the present invention contemplates a combination switch and variable resistance device or volume control assembled from a few prefabricated parts which can be readily assembled to meet varying requirements. The parts have means for being quickly attached together so as to form a multiple or tandem assembly when required. Two or more concentrically interfitting shafts can be provided for the separate control of individual sections. Cover plates, mounting plates and other parts are readily attachable without special tools.

Referring to the drawings, there are shown two volume controls and a switch attached together to form a tandem assembly, the separate sections of which are adapted to be individually controlled by one of the concentric shafts utilized therein.

As seen, the complete assembly comprises a multiplicity of resistive controls placed in tandem relationship with a switch section. Each of these, the controls and the switch, is solidly coupled to its neighbor in a manner such as to preclude the use of staking or clamping tools. In the assembly, as above, the switch and controls used are inherently ones which are commonly used, modifications being made thereto as required for the present invention.

The switch 10 has a cup containing the usual snap switching elements. The bottom of this cup has an arcuate slot through which a switch activator 16 passes. Above this activator, on the cup, a pair of prongs are extended outwardly so as to form a plurality of coupling tongues 13 which are aligned with apertures 14 formed in a switch attaching spring 15. This spring is welded to the rear cup 12 of its adjacent or rear resistive control 17. This switch clamp 11 comprising a cup shaped frame 20 which is adapted to be placed over the switch itself so as to support the same thereon. This frame has both ends open with the bottom end thereof having a lip 19 fitting over the bottom of the switch having the terminals 21. The switch is held thereon. The side wall of the frame has a plurality of slots 22, here being three slots in number. These slots are slanted upward from the open end of the side wall to form ascending keyways for the toothed prongs of the switch attaching spring. At the bottom of the ascending slots there are U-shaped bays 26 which allow for the introduction of each tooth so that it is enabled to ride up on the lower lip of the slot to securely lock the switch to the rear control upon rotation of the same in the manner of a rotating spiral.

Internally of the rear control 17, there are some modifications which are not usual to this type of control. There is, as seen, the cup which has the switch attaching plate 18 connected to it. The rotor 25 constitutes a substantially rectangular insulative form through which a rear shaft 37 penetrates. The shaft on its underside has a hollow first portion 41 adapted to rotate about a central collar 38 inwardly and integrally formed of the bottom wall of the control. There is also attached to this part of the shaft the actuator 39 and stop elements 40 for the switch and control respectively. The actuator moves the switch actuator while the stop impinges against a struck out portion 43 of the inside wall of rear control cup. This will stop the rotation of the wiper spring arm 44 as it is moved by the rotor. Adjacent the wiper arm spring 44 and centrally located therebetween is a rear shaft section 41. This section includes a circular extension which has a thin collar portion 45 and a thick lower portion 40. The lower portion is slotted rectangularly for a depth which will accept a milled somewhat rectangular extent 29 of the inner shaft 30 and will provide a bearing surface for the shoulder of the shaft. As is usual, the resistive track 56 and the ground ring 50 for the control, to which electric terminals are attached, are placed on the beneath side of an insulative plate. On the other side there is adjacently placed a metal mounting plate 31 which has a pair of dimples which allows the plate to be held thereon. This mounting plate has a central portion annularly extruded. A central opening passes therethrough. Placed in the inner recess made by the extrusion is a clutching multi-legged shaft retaining spring 32 which is adapted to be retained in the recess. The recess has a plurality of depressions which contain corresponding lugs formed in the clutching ring. The ring is thus anchored and retained against rotational movement. On the platform formed by the extrusion there is welded a metal control mounting spring 33. This is centrally apertured and has a plurality of circumferential extensions 50 which are adapted to clutch the front control of the tandem unit as hereinafter described.

The front control 61 is adapted to be connected to the rear control 17 by means of a plurality of attachment hooks 62 which are integrally formed on the periphery of its attachment plate 63. The hooks are configured such that a portion extends axially from the plate and has a head hook portion which is pointed to grasp the corresponding projections on the mounting plate of the rear control. The front attachment plate 63 has a collar portion which extends into the central aperture of the extruded plate of the rear control in a manner such as to tightly contain the shaft retaining spring in its position about the inner shaft of the tandem control.

The front attachment plate 63 is welded to the front cup of the front control 61. The cup has a predetermined configuration which includes a plurality of extensions for holding down a bushing 64 on top of the resistance ring 65 of the front control which is mounted on a fiber insulative support to which a ground ring and terminals are also attached. Important in the construction, is the manner of containing the front shaft 70. This front shaft is connected to the end 75 of the front control which will then be enabled to move the rotor of the front control while there is placed concentrically within said end shaft 75, the inner shaft 30 for moving the switch and the rear shaft as it rotates the rotor of the front control.

The rotor 76 of the front control 61 (Fig. 4) comprises a dumbbell shaped metal disc having two rectangular cut-out portions. The disc has a central aperture which is substantially annular in shape except for the fact that opposing portions of the annular wall of the aperture have slight rectangular notched portions which accept the finger portions 78 of shaft 70 to aid in the retention of the shaft as it is placed centrally through the wiper arm 80 of the control, which in turn is clamped to a thin insulative rectangular slab 81. This slab is held on the metal disc by end shaft 75. The portion of the front shaft which is on the side of the spring wiper arm has a pair of key-way slots 82 cut out of the longer wall thereof. Somewhat less than half way up this longitudinal wall, a retaining slot 83 for a snap ring 84 is formed. This snap ring acts with the finger projections or keys formed in shaft 70 to lock the same to the end shaft when it is inserted therein.

As seen, the terminals 86, the resistive track 87 and ground ring 88 which are wiped by the rotor spring arm, are contained on an insulative form held on the cup by means of fingers integrally formed of the side wall thereof. The inner shaft penetrates the form at its center. Further thereto, the mounting bushing for the entire assembly also is retained on the insulative form. The bushing 64 is held thereon by being clutched by fingers 98 of the side wall of the first cup 89. As formed the bushing 64 has a wing portion containing dimples which fall into corresponding elements made in the insulative form. These dimples aid in maintaining the bushing firmly against rotation. Moreover the central portion of the bushing which holds the shaft is outwardly stepped to allow some axial play of the shaft and to aid in the resilience of the wiping action of the spring arms of the front control. In addition, the snap ring 84 clutching the outer shaft 70 to toe end shaft 75 is enabled to move against the central portion of the bushing so that a bearing surface is provided therefor. This acts to securely lock the snap ring against movement and creates a tightness which tightly locks the outer and front shafts together.

Figure 20:
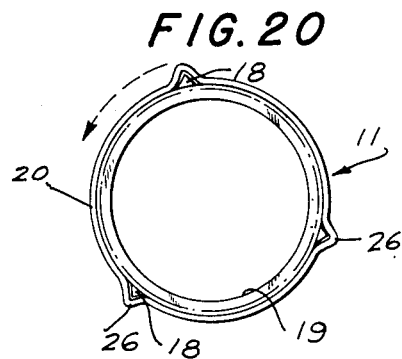
Figure 21:
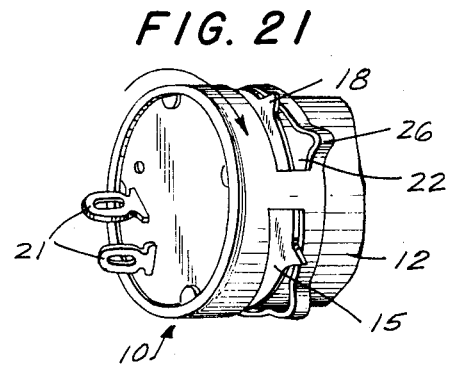

By means of the above construction, the assembly of the composite individual units to form a desired tandem arrangement is made relatively simple. The procedure (Figs. 15–21) simply requires first, a twist of the front control on 61 to the rear control 17. Next, the switch 10 is placed on the rear control 17 with the projections thereof being shoved into the slots of the rear control and properly located therein. Then the switch clamp 11 is placed over the switch and the lugs 18 of the attachment plate of the rear control are introduced into the slanting slots 22 of the clamp 11 via the protuberances 26 thereof. The clamping plate is rotated (Fig. 20) and the lugs ride in the slots to tightly gather the switch and rear control together (Fig. 21). The outer shaft 20 is then placed through the bushing aperture so that the prongs thereof engage the keyways of the end shaft and locked thereto by means of the snap ring contained thereon. The outer shaft is tightly retained to the end shaft by means of the snap ring since a flange of the bushing acts as a backing which prevents the ring from opening.

Continuing with the assembly, the inner shaft 30 is inserted through the hollow outer shaft until its milled portion 29 fits and is located in the rectangular slot of the rear shaft. As the shoulder of the inner shaft is pressed down, the shaft retaining spring clutches the shaft so as to lock the same. Thus, within less than a minute, a composite control is assembled wherein the individual switch and central sections may have any desired value and which may be mounted in tandem for individual operation without the need for tools or any complicated mounting or assembly techniques. In effect, a universally adaptable composite switch and assembly structure has been provided for replacement and varying needs.

The invention, as hereinbefore described, thus has great utility and since the features thereof may be readily adapted for many uses, it is intended that its scope be limited and defined by the appended claims.

What is claimed is:

1. A readily assembled tandem unit comprising a plurality of separate and individual switch and control sections, said separate section being of predetermined values which may vary according to the electrical needs of the composite unit, said switch unit having axial prongs, an adjoining resistive control of a determined value having a pair of slots into which said prongs are inserted, a clamp having a plurality of slots for said switch adapted to hold the same therein, said control having connectors insertable within the slots of said clamp, a rear shaft included in said control, said rear shaft being mounted centrally on the rotor included in said control, an inner shaft having a milled portion connected to said rear shaft, a shaft retaining spring aiding the coupling of said inner shaft to said rear control, a resistive track on an insulative disc placed in said control to be wiped by the contact arm thereof, and a mounting plate for said control held upon said disc, said shaft retaining spring being held between said mounting plate and said resistive insulative disc, said combined inner and rear shafts acting to rotate said wiper on said track and to activate said switch.

2. A tandem electrical control and switch unit which is readily assembled, said assembly comprising a plurality of individual control units and a switch unit, said switch unit including means for activating the same and a casing encompassing its parts, a pair of prongs extending from said casing axially thereof, a resistive control having a rotor, an insulative disc on which an arcuate resistive path is placed, means on said rotor for wiping said resistive path, a rear shaft having a rectangular recess thereon, a casing for said control having a pair of apertures aligned with said prongs of said switch casing, a switch attaching spring mounted on said casing, a switch clamp meeting with said attaching spring to connect said switch and said control together, a shaft retaining spring placed against said insulative disc, an inner shaft falling within said recess of said rear shaft, said shaft retaining spring gripping said shaft to aid in the retention of the same, a mounting plate on said cup of control, said plate also having a spring member placed thereon, a second control attached thereto, said control having a second shaft for moving a rotor and wiped on its resistance path, said shaft being concentric with said first inner shaft and means for mounting said second control to a bushing.

3. A tandem electrical control and switch unit which is readily assembled, said assembly comprising a plurality of individual control units and a switch unit, said switch unit including means for activating the same and a casing encompassing its parts, a pair of prongs extending from said casing axially thereof, a resistive control having a rotor, an insulative disc on which an arcuate resistive path is placed, means on said rotor for wiping said resistive path, a rear shaft having a rectangular recess thereon, a casing for said control having a pair of apertures aligned with said prongs of said switch casing, a switch attaching spring mounted on said casing, a switch clamp meeting with said attaching spring to connect said switch and said control togther, a shaft retaining spring placed against said insulative disc, an inner shaft falling within said recess of said rear shaft, said shaft retaining spring gripping said shaft to aid in the retention of the same, a mounting plate on said cup of said control, a spring attached thereto, said spring having extensions thereon, a second resistive control comprising a casing having an attachment plate thereon, said attachment plate and spring adapted to be coupled by said extensions, a rotor having a wiper for making contact with the resistive path therein, said rotor containing a front shaft, said shaft being slotted and having an annular groove cut therein for accepting a snap ring, means on said casing for mounting a bushing thereto, and an outer shaft entering said bushing and having ears interfitting said slots of said front shaft, said snap ring being tightly gathered about said aforesaid front and outer shafts in the groove made thereon, said snap ring cooperating with said bushing to aid in the tight retention of said outer and front shafts.

4. A tandem electrical control and switch unit which is readily assembled, said assembly comprising a plurality of individual control units and a switch unit, said switch unit including means for activating the same and a casing encompassing its parts, a pair of prongs extending from said casing axially thereof, a resistive control having a rotor, an insulative disc on which an arcuate resistive path is placed, means on said rotor for wiping said resistive path, a rear shaft having a rectangular recess thereon, a casing for said control having a pair of apertures aligned with said prongs of said switch casing, a switch attaching spring mounted on said casing, a switch clamp meeting with said attaching spring to connect said switch and said control together, a shaft retaining spring placed against said insulative disc, an inner shaft falling within said recess of said rear shaft, said shaft retaining spring gripping said shaft to aid in the retention of the same, a mounting plate on said cup of said control, a spring welded thereto, said spring having extensions thereon, a front control for being attached to said first control, said front control including an attachment plate welded to a casing therefor, said plate having gripping means connecting said front control to said first control, said casing of said front control including a resistive track wiped by wipers contained on a rotor, said rotor carrying a front shaft thereon, means on said front cup coupling a bushing thereto, said bushing having a flange, and an outer shaft coupled to said front shaft, a snap ring held against said flange aiding in said coupling, said front and outer shafts thus forming a unitary shaft for moving said rotor of said front control.

5. A tandem electrical control and switch unit which is readily assembled, said assembly comprising a plurality of individual control units and a switch unit, said switch unit including means for activating the same and a casing encompassing its parts, a pair of prongs extending from said casing axially thereof, a resistive control having a rotor, an insulative disc on which an arcuate resistive path is placed, means on said rotor for wiping said resistive path, a rear shaft having a rectangular recess thereon, a casing for said control having a pair of apertures aligned with said prongs of said switch casing, a switch attaching spring mounted on said casing, a switch clamp meeting with said attaching spring to connect said switch and said control together, a shaft retaining spring placed against said insulative disc, an inner shaft falling within said recess of said rear shaft, said shaft retaining spring gripping said shaft to aid in the retention of the same, a mounting plate on said cup of said control, a spring welded thereto, said spring having extensions thereon, a front control for being attached to said first control, said front control including an attachment plate joined to its surrounding cup, said plate having connecting ears which meet with said spring member of said first control to grip the same so as to connect said first control to said front cups, a resistive track in said front cup, a rotor including contact means for wiping said track, said rotor having a centrally disposed front shaft disposed thereon, said shaft being slotted and having a retaining spring placed thereabout in a groove made therein, a hollow bushing held on said cup by a mounting plate fastened thereto, a front hollow shaft placed in said hollow bushing, a portion thereof having prongs insertable with said slots in said inner shaft to form a composite shaft for rotating said rotor of said front control and an outer shaft disposed through said composite shaft formed by said outer and front shafts, said outer shaft inserted into said rear shaft to be held therein for moving the rotor of said first control and to activate said switch, said entire tandem unit being assembled in a matter of seconds by the mere attachment of the parts free of the use of assembly tools.

References Cited in the file of this patent
UNITED STATES PATENTS

| | | |
|---|---|---|
| 2,401,037 | Arvin | May 28, 1946 |
| 2,659,793 | Daily et al. | Nov. 17, 1953 |
| 2,777,924 | Youngbeck | Jan. 15, 1957 |
| 2,883,500 | Budd et al. | Apr. 21, 1959 |